(12) United States Patent
Sakamoto

(10) Patent No.: US 10,153,576 B2
(45) Date of Patent: Dec. 11, 2018

(54) ELECTRONIC COMPONENT AND IMAGING DEVICE

(71) Applicant: IRISO ELECTRONICS CO., LTD., Kanagawa (JP)

(72) Inventor: Tetsuma Sakamoto, Kanagawa (JP)

(73) Assignee: IRISO ELECTRONICS CO., LTD., Kanagawa (JP)

(*) Notice: Subject to any disclaimer, the term of this patent is extended or adjusted under 35 U.S.C. 154(b) by 0 days.

(21) Appl. No.: 15/822,690

(22) Filed: Nov. 27, 2017

(65) Prior Publication Data

US 2018/0159258 A1     Jun. 7, 2018

(30) Foreign Application Priority Data

Dec. 1, 2016   (JP) ................................ 2016-234502

(51) Int. Cl.

| | |
|---|---|
| H01R 12/00 | (2006.01) |
| H01R 13/24 | (2006.01) |
| H01R 13/17 | (2006.01) |
| G03B 17/02 | (2006.01) |
| H01R 31/06 | (2006.01) |

(52) U.S. Cl.
CPC ............ *H01R 13/24* (2013.01); *G03B 17/02* (2013.01); *H01R 13/17* (2013.01); *H01R 13/2442* (2013.01); *H01R 31/06* (2013.01)

(58) Field of Classification Search
CPC . H01R 12/716; H01R 12/724; H01R 13/5213
USPC ................................................ 439/76.1, 931
See application file for complete search history.

(56) References Cited

U.S. PATENT DOCUMENTS

| | | | | |
|---|---|---|---|---|
| 6,602,089 B2* | 8/2003 | Abe | ..................... | H01R 12/675 29/854 |
| 6,616,480 B2* | 9/2003 | Kameyama | .......... | H01R 13/521 439/271 |
| 7,150,633 B2* | 12/2006 | Ishikura | ................. | H01R 13/52 439/76.1 |
| 7,473,134 B2* | 1/2009 | Zhang | .................... | H01R 12/79 439/607.01 |
| 7,802,996 B2* | 9/2010 | Kusaki | ................. | G02B 13/001 439/76.1 |
| 8,075,477 B2* | 12/2011 | Nakamura | ........... | A61B 1/0011 439/67 |

(Continued)

FOREIGN PATENT DOCUMENTS

JP     2008-170801 A     7/2008

*Primary Examiner* — Phuong Dinh
(74) *Attorney, Agent, or Firm* — Cermak Nakajima & McGowan LLP; Tomoko Nakajima

(57) ABSTRACT

In an imaging device, an electric connection is achieved in which a pressing force of a terminal of a substrate-side connector does not act on a substrate stored in a housing. Harness connection terminals have inner-surface contact pieces each shaped like a flat plate and extending along an inner peripheral surface of a cylindrical peripheral wall of a rear housing. Terminals of a connector have press contact portions in press contact with the inner-surface contact pieces in a radial direction of the cylindrical peripheral wall. The pressing force of the press contact portions acts in the radial direction of the cylindrical peripheral wall, but does not act in the plate thickness direction of the substrate. This avoids warpage of the substrate.

7 Claims, 9 Drawing Sheets

(56) References Cited

U.S. PATENT DOCUMENTS 8,098,326 B2 * 1/2012 Takashima ............. G03B 15/05
348/375

* cited by examiner

ELECTRONIC COMPONENT AND IMAGING DEVICE

BACKGROUND OF THE INVENTION

1. Field of the Invention

The present invention relates to an electronic component, and more particularly, to an electronic component for an imaging device, such as an on-vehicle camera, and an imaging device including the electronic component.

2. Description of the Related Art

There are used small imaging devices each including an image pickup element, such as a vehicle drive recorder, an on-vehicle camera used to improve visibility on the rear side of the vehicle, and a monitoring camera used for crime prevention in a bank and a store. For example, Japanese Unexamined Patent Application Publication No. 2008-170801 (FIG. 1) (PTL 1) describes an example of such a conventional imaging device.

This imaging device includes a box-shaped housing having a front housing and a rear housing. Inside the housing, a substrate having an image pickup element mounted on one surface thereof is stored. On the other surface of the substrate, a substrate-side connector is mounted. In the rear housing, contact portions of harness connection terminals are disposed at positions opposed to terminals of the substrate-side connector. When the front housing and the rear housing are combined, the contact portions are brought into press contact with the terminals of the substrate-side connector and are conductively connected thereto. At the other ends of the harness connection terminals, other contact portions are provided to be conductively connected to a harness (wire cable) serving as an external conductor. Imaging signals generated in the imaging device are transmitted to an external apparatus through the harness.

When the contact portions of the harness connection terminals are in press contact with the terminals of the substrate-side connector as in this conventional imaging device, the spring force (reactive force) of the terminals of the substrate-side connector, which receive the pressing force of the contact portions of the harness connection terminals, continuously acts on the substrate on which the substrate-side connector is mounted, and this may warp the substrate. If the substrate is warped, the focal position of the image pickup element may be displaced, and a soldered portion of an electronic component mounted on the substrate may be cracked. In particular, smaller and lighter imaging devices have been developed, and imaging devices including a substrate having a thickness of less than 1 mm have been gradually used. Therefore, the substrate is easily warped by a smaller pressing force owing to such thickness reduction. Hence, it is preferable to minimize the spring force the substrate receives from the mounted substrate-side connector.

SUMMARY OF THE INVENTION

The present invention has been made in the context of the related art described above, and an object of the invention is to achieve such an electric connection that the spring force of terminals of a substrate-side connector mounted on a substrate in an imaging device does not act on the substrate.

To achieve the above object, the present invention has the following features.

The present invention provides an electronic component for an imaging device, including a housing and a terminal fixed to the housing. The housing includes an external-conductor connecting portion to which an external conductor is fitted and connected, a cylindrical peripheral wall that receives a substrate with a connector mounted thereon, and a partition that separates the external-conductor connecting portion and an inside of the cylindrical peripheral wall. The terminal has an outer contact portion disposed in the external-conductor connecting portion to be in conductive contact with the external conductor. The terminal includes an inner contact portion in press contact with a connector terminal of the connector in a cylinder axis intersecting direction of the cylindrical peripheral wall, and a relay portion embedded in the partition and extending to connect the outer contact portion and the inner contact portion.

According to the present invention, the terminal (harness connection terminal) has the inner contact portion in press contact with the connector terminal of the connector (substrate-side connector) in the cylinder axis intersecting direction of the cylindrical peripheral wall. Hence, the terminal is not in elastic contact with the connector terminal in the cylinder axial direction of the cylindrical peripheral wall. That is, since the inner contact portion of the terminal is in press contact with the connector terminal in the radial direction of the cylindrical peripheral wall, the spring force of the connector terminal does not act in the thickness direction of the substrate. Further, according to the present invention, the relay portion is embedded in the partition and extends to connect the outer contact portion and the inner contact portion. Hence, it is possible to minimize the space where the relay portion extending from the outer contact portion to the inner peripheral surface of the cylindrical peripheral wall is disposed. Such a relay portion may be completely embedded in the partition or may be partly embedded therein. With any of these structures, the relay portion can reduce the occupied space in the inner space of the cylindrical peripheral wall, and this contributes to space saving inside the housing and size reduction of the housing.

The inner contact portion can have such a length as to protrude from the partition wall through a plate thickness of the substrate. According to this, to align the optical axis of an image pickup element (adjust the focal position), the degree of flexibility in adjusting the mounting position of the substrate along the length direction of the inner contact portion can be increased. When the connector is mounted on the surface of the substrate opposed to the partition, a useless dead space is sometimes formed around the connector. According to the present invention, however, since the inner contact portion protrudes to the opposite surface opposite from the opposed surface through the plate thickness of the substrate, the connector can be mounted on the opposite surface. Therefore, the substrate can be disposed as close as possible to the partition. This contributes to space saving inside the housing and size reduction of the housing.

The relay portion can be formed as a flat conductive piece made of a flat metal piece. Since the relay portion is the flat conductive piece, the partition can be made thinner than when the relay portion has a circular cross section like a pin terminal or an electric wire. This contributes to size reduction of the housing.

The inner contact portion can be formed as an inner-surface contact piece having a flat contact surface exposed along an inner peripheral surface of the cylindrical peripheral wall. When the inner contact portion is formed as the inner-surface contact piece having the flat contact surface exposed along the inner peripheral surface of the cylindrical peripheral wall, a conductive connection structure can be achieved in which the connector terminal of the connector faces the inner peripheral surface of the cylindrical peripheral wall to be in press contact with the inner-surface contact piece. This can prevent the spring force of the connector terminal from acting in the plate thickness direction of the substrate.

The inner contact portion can be formed as a spring contact piece projecting from an inner peripheral surface of the cylindrical peripheral wall into an inner space of the cylindrical peripheral wall. Since the spring contact piece projects from the inner peripheral surface of the cylindrical peripheral wall into the inner space of the cylindrical peripheral wall, the spring force of the spring contact piece does not act in the plate thickness direction of the substrate.

In the electronic component including the connector according to the present invention, the connector terminal has a press contact portion in press contact with the inner contact portion in the cylinder axis intersecting direction of the cylindrical peripheral wall. According to this electronic component, since the connector terminal has the press contact portion in press contact with the inner contact portion in the axis intersecting direction of the cylindrical peripheral wall, the spring force of the press contact portion of the connector terminal can be prevented from acting in the plate thickness direction of the substrate, but the inner contact portion of the terminal and the press contact portion of the connector terminal can be reliably brought into conductive contact with each other.

The present invention further provides an imaging device including the electronic component according to any of the above-described electronic components. According to this, the spring force of the connector terminal does not act on a substrate provided in the imaging device in a plate thickness direction of the substrate. Hence, it is possible to achieve thickness reduction of the substrate provided in the imaging device, space saving of the inner space of the housing, and size reduction of the entire imaging device.

According to the present invention, since the spring force of the connector terminal does not act on the substrate in the imaging device in the plate thickness direction of the substrate, the imaging device can have high quality without any trouble, for example, without warping the substrate and cracking a soldered portion on the substrate. Further, since the total size of the imaging device can be reduced, the usage of the imaging device can be expanded.

DESCRIPTION OF THE PREFERRED EMBODIMENTS

Figure 1:
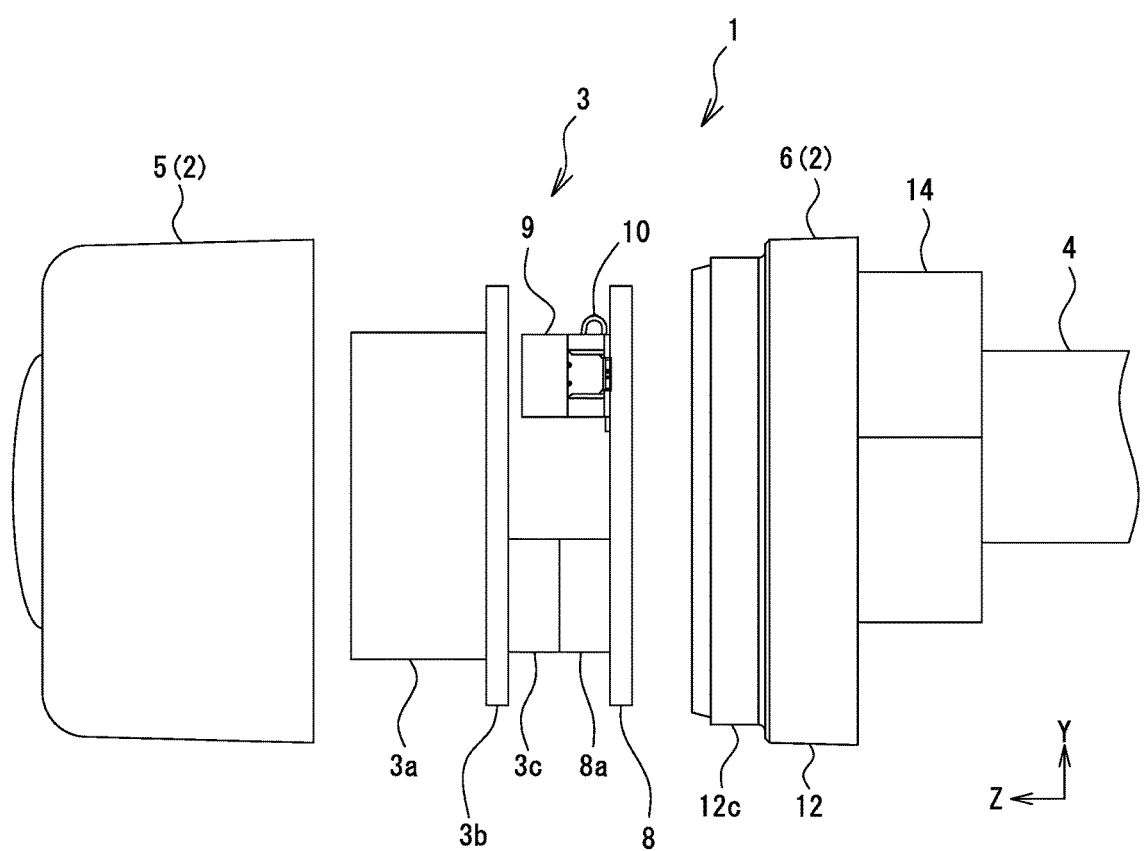
FIG. 1 is an exploded view of an imaging device according to a first embodiment.
Figure 2:
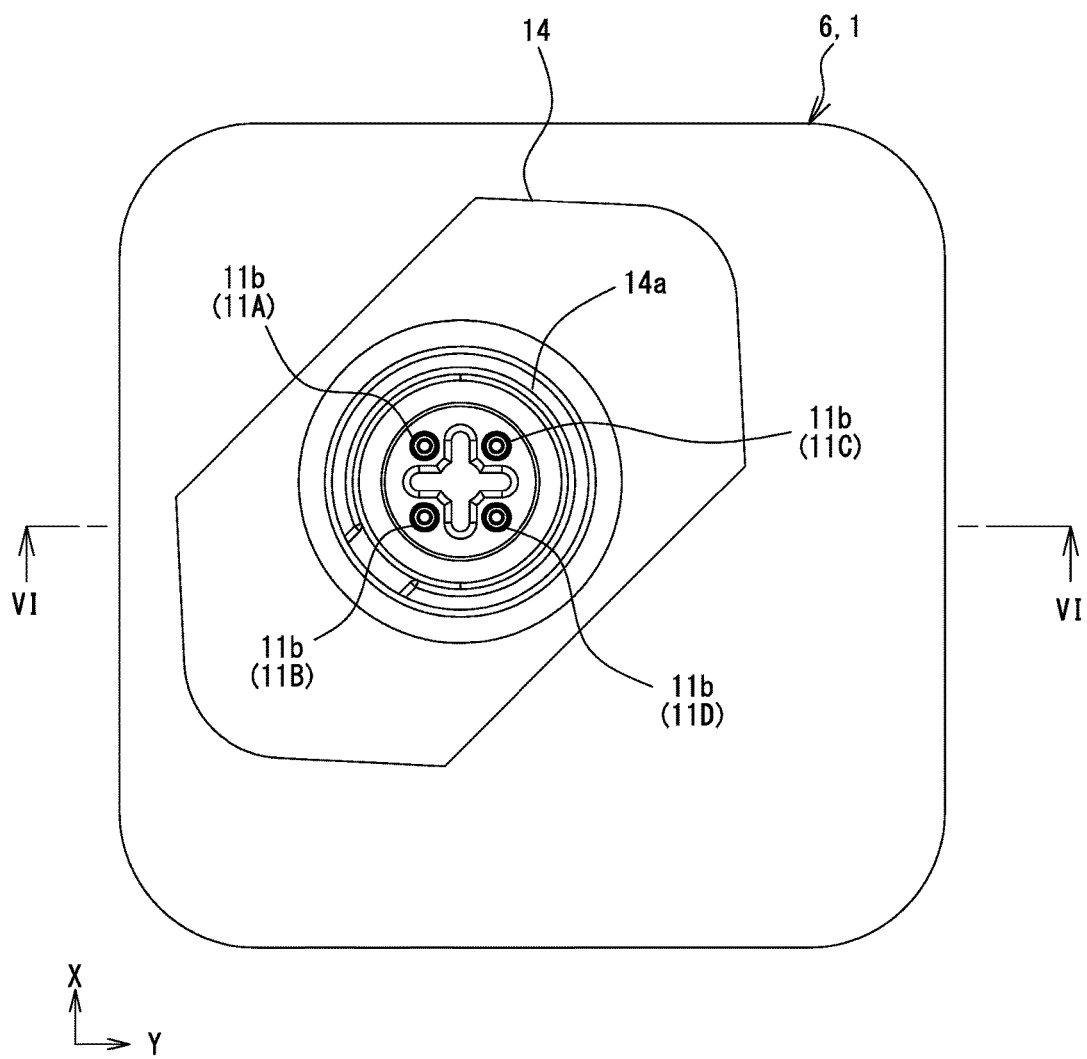
FIG. 2 is an explanatory view of a rear housing in FIG. 1.
Figure 3:
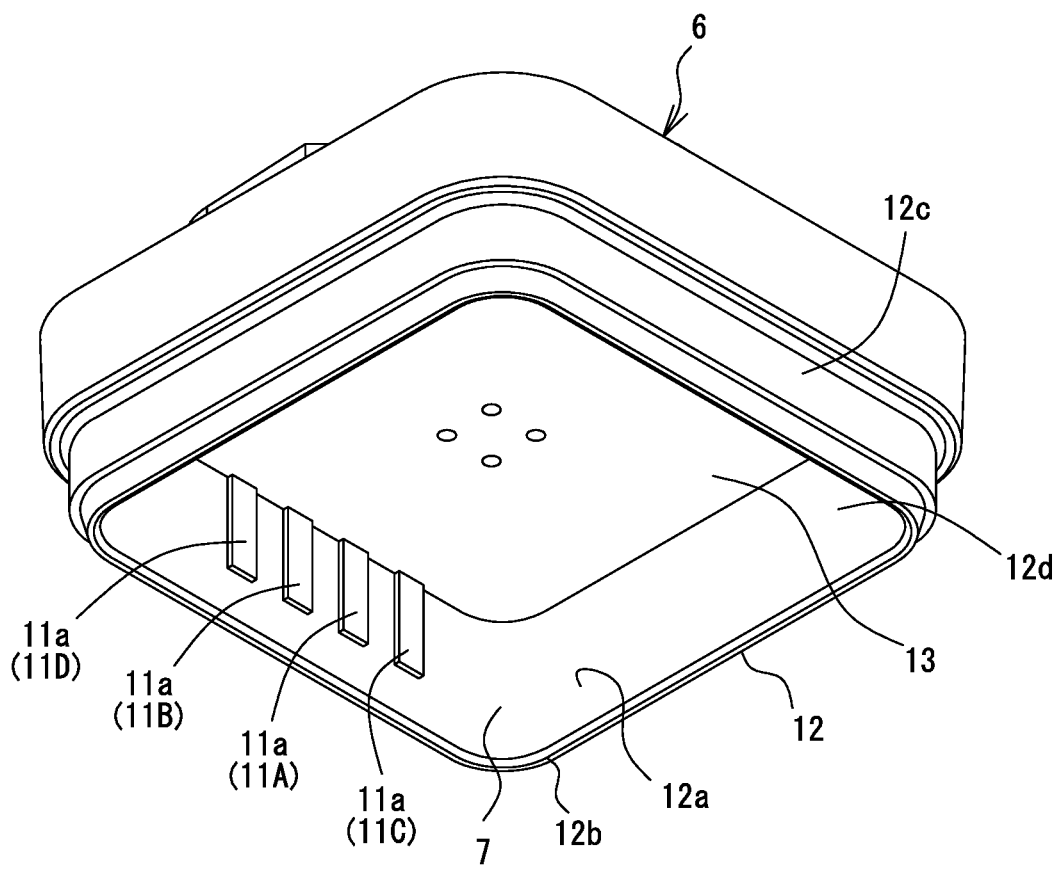
FIG. 3 is an assembly explanation view of the rear housing and a substrate in FIG. 2.
Figure 3:
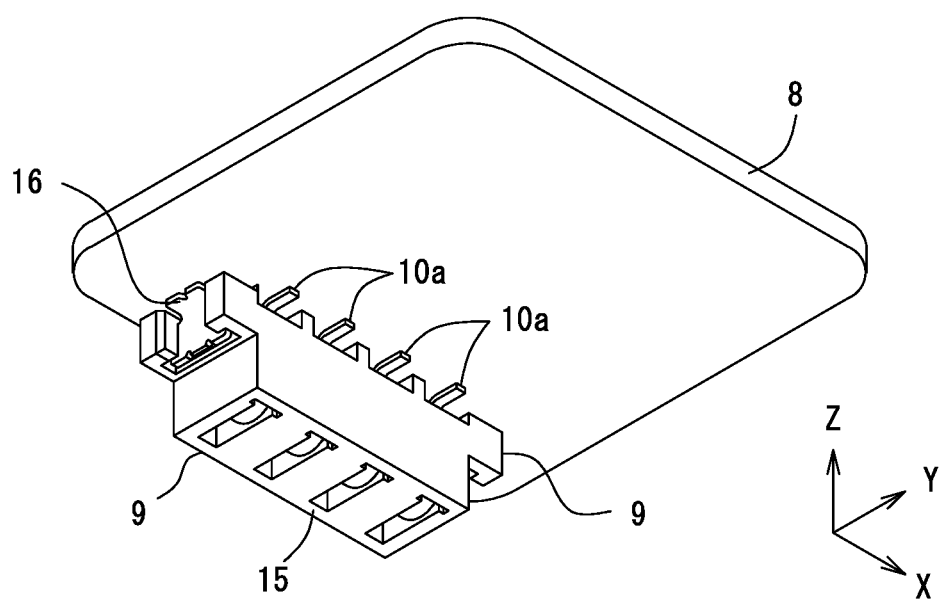

An embodiment of the present invention will be descried below with reference to the drawings. In this description, the claims, and the drawings, an arrangement direction of terminals in a connector mounted on a substrate illustrated in FIG. 1 is taken as an X-direction (right-left direction), a depth direction of the connector is taken as a Y-direction (front-rear direction), and an optical axis direction of an image pickup element provided in an imaging device (height direction of the imaging device) is taken as a Z-direction (up-down direction). However, these definitions of the right-left, front-rear, and up-down directions do not limit the mount direction and use direction of the imaging device and so on in the present invention.

First Embodiment [FIGS. 1 to 7]

FIG. 1 illustrates an outline of an imaging device 1. The imaging device 1 includes a housing 2 formed by a resin body molded from hard resin, an imaging component 3, and a harness component 4. These components that constitute the imaging device 1 constitute "electronic component" in the present invention.

The housing 2 includes a front housing 5 and a rear housing 6. The imaging component 3 is stored in an inner space 7 of the housing 2. The imaging component 3 of the first embodiment includes an image pickup element 3a, a base 3b on which the image pickup element 3a is mounted, a substrate 8, and a connector 9 mounted on the substrate 8. On the base 3b and the substrate 8, unillustrated circuit lines and elements for a signal processing system are mounted, and are conductively connected by inter-substrate connectors 3c and 8a. The connector 9 includes a plurality of terminals 10 serving as "connector terminal", and the terminals 10 are in conductive contact with harness connection terminals 11A, 11B, 11C, and 11D fixed as "terminal" to the rear housing 6 (see FIG. 3). The harness component 4 serving as "external conductor" is connected to an unillustrated external apparatus. The imaging device 1 having the above-described general configuration is characterized in the rear housing 6, the harness connection terminals 11A to 11D, and the imaging component 3. Accordingly, these components will be described in more detail.

Rear Housing 6

The rear housing 6 includes a cylindrical peripheral wall 12, a partition 13 that closes one end of the cylindrical peripheral wall 12, and an external-conductor connecting portion 14 projecting from the partition 13.

Figure 7:
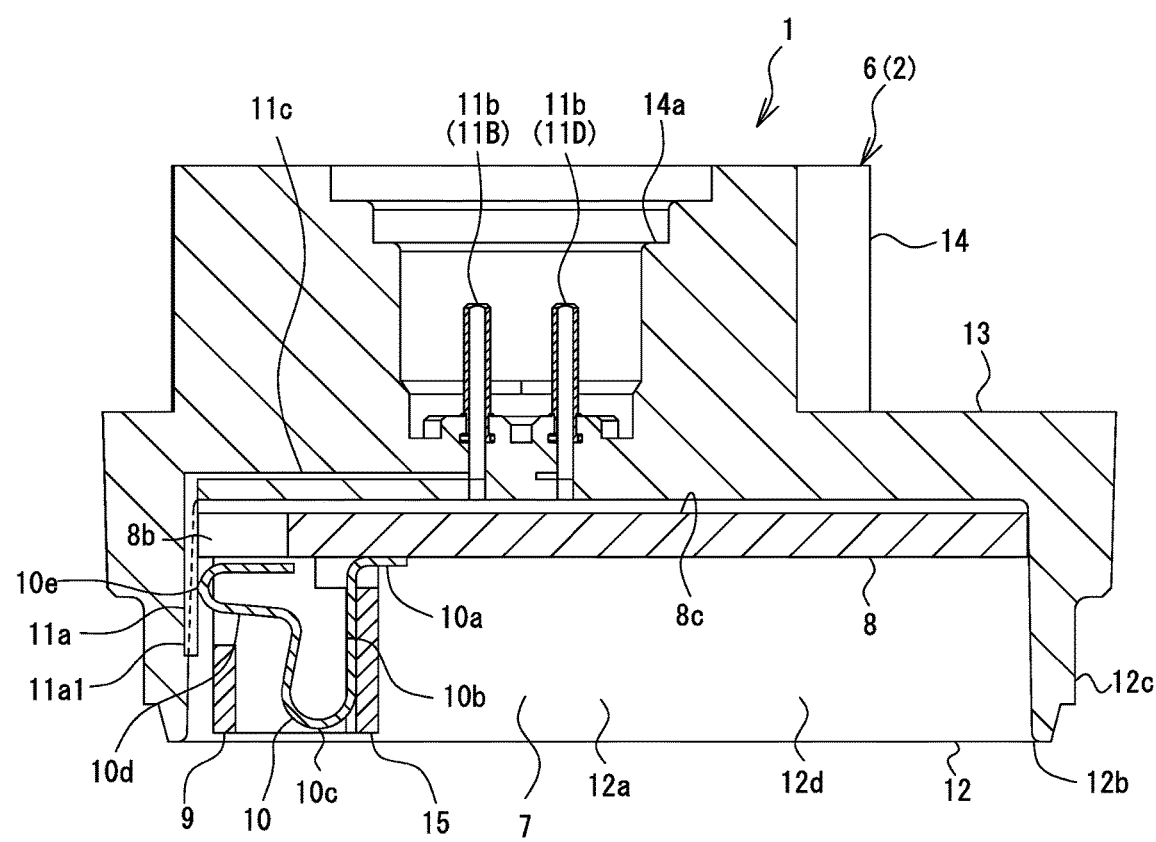
FIG. 7 is a cross-sectional view illustrating a state in which the substrate is set from the state of FIG. 6 into the rear housing.

The cylindrical peripheral wall 12 is shaped like a rectangular cylinder, and an inner space 12a for receiving the substrate 8 and the connector 9 is provided inside the cylindrical peripheral wall 12. As illustrated in FIG. 7, the height of the inner space 12a of the rear housing 6 in the Z-direction (height of the cylindrical peripheral wall 12 from the partition 13) is set small to such an extent that the connector 9 does not protrude from an open end 12b of the cylindrical peripheral wall 12 in a state in which the substrate 8 and the connector 9 are received in the inner space 12a. A fitting portion 12c for the front housing 5 is provided on an outer peripheral surface of the cylindrical peripheral wall 12, and the front housing 5 is fitted on the fitting portion 12c, so that the imaging device 1 is assembled. One surface of inner surfaces 12d of the cylindrical peripheral wall 12 has a plurality of inner-surface contact pieces 11a serving as "inner contact portion" provided at one end of each of the harness connection terminals 11A to 11D.

The partition 13 is provided to close one end of the cylindrical peripheral wall 12. In this partition 13, the harness connection terminals 11A to 11D are partly embedded, as will be described later. The external-conductor connecting portion 14 protrudes from an outer surface of the partition 13 that forms an outer surface of the rear housing 6. The external-conductor connecting portion 14 has a fitting recess 14a, and a plurality of pin-shaped contact portions 11b serving as "outer contact portion" of the harness connection terminals 11A to 11D project in the fitting recess 14a. When the harness component 4 is fitted in the fitting recess 14a, the pin-shaped contact portions 11b and the harness component 4 are conductively connected to each other.

Harness Connection Terminals 11A to 11D

The harness connection terminals 11A to 11D are provided as separate terminals. The pin-shaped contact portions 11b of the harness connection terminals 11A to 11D are each shaped like a cylindrical contact piece, and are inserted in and conductively connected to unillustrated socket terminals of the harness component 4.

Figure 4:
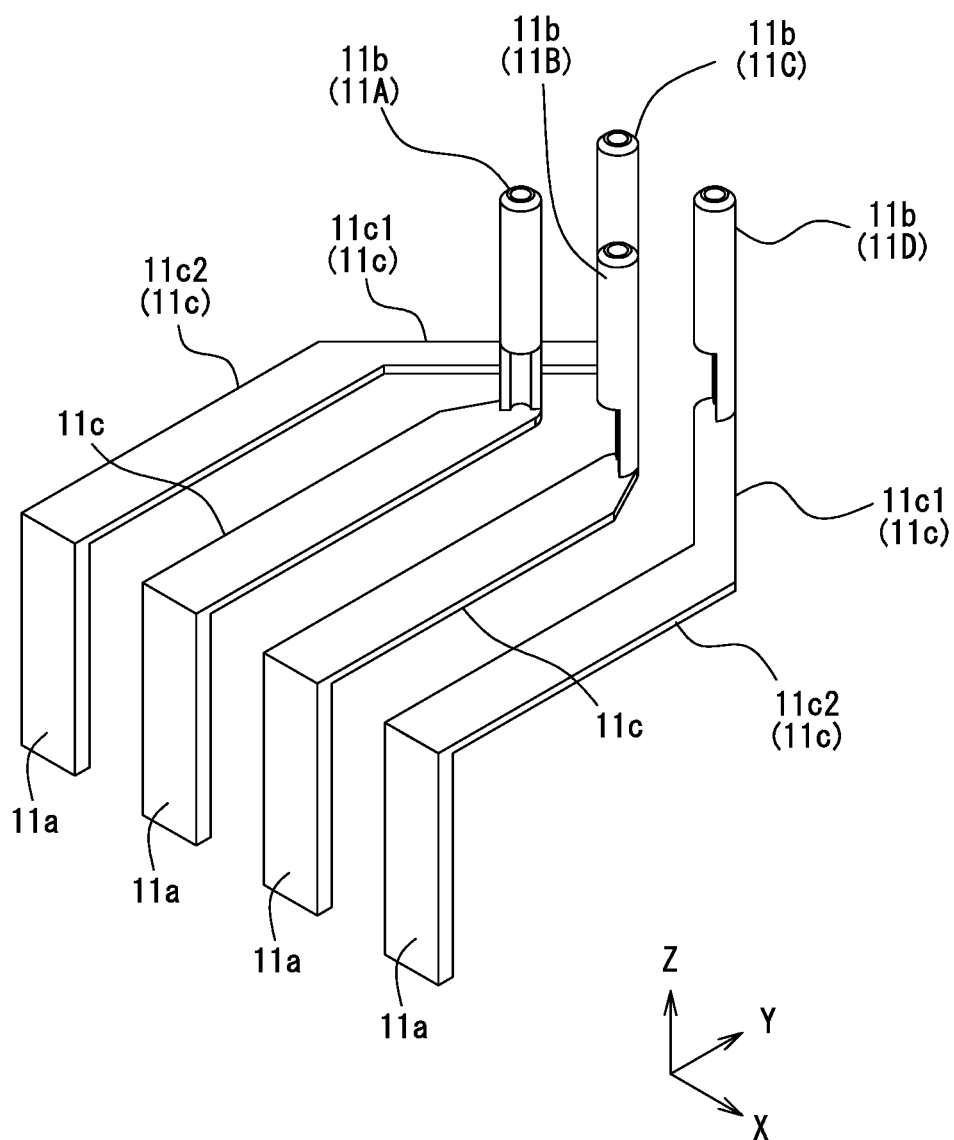
FIG. 4 is an external perspective view of harness connection terminals in FIG. 3.
Figure 5:
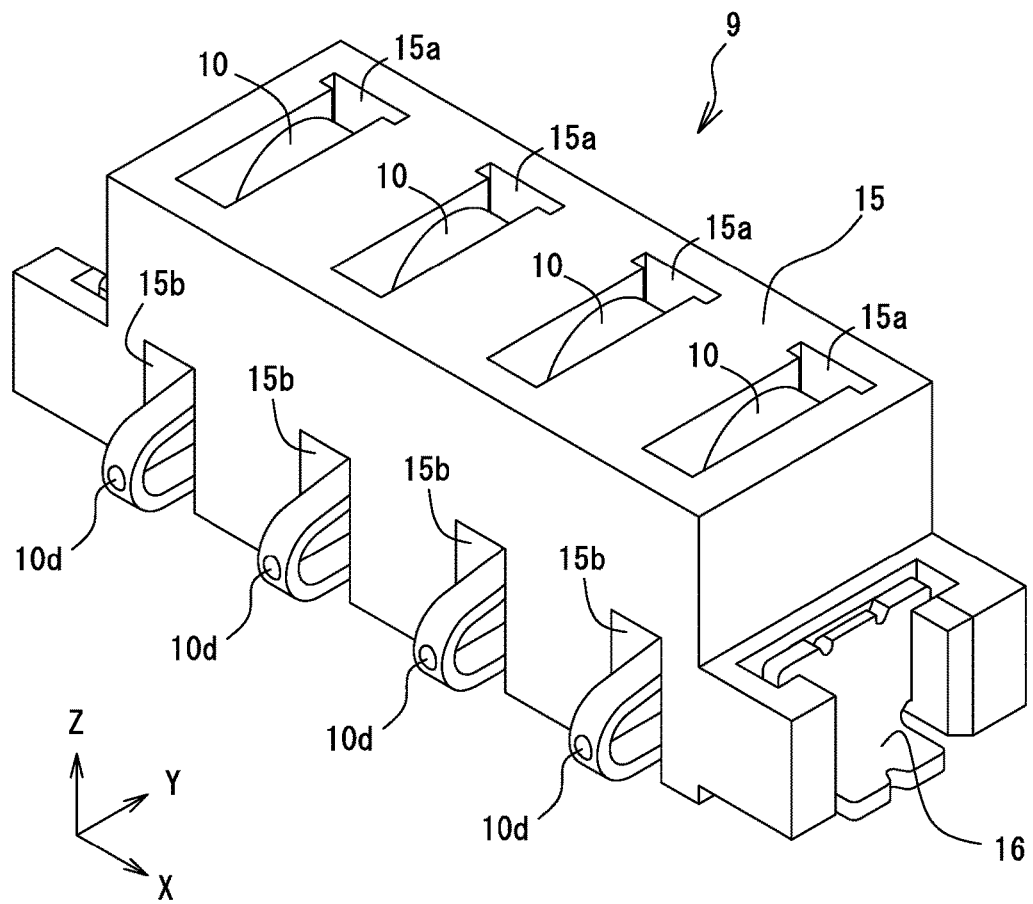
FIG. 5 is an external perspective view of a connector in FIG. 3.

In the harness connection terminals 11A to 11D, the projecting positions of the pin-shaped contact portions 11b in the fitting recess 14a of the partition 13 are different from the projecting positions of the inner-surface contact pieces 11a on the inner peripheral surface 12d of the cylindrical peripheral wall 12, and relay portions 11c are provided to connect the inner-surface contact pieces 11a and the pin-shaped contact portions 11b. As illustrated in FIG. 4, the relay portions 11c of the harness connection terminals 11A and 11B are linearly shaped while the pin-shaped contact portions 11b are located on the side of the cylindrical peripheral wall 12. The relay portions 11c of the harness connection terminals 11C and 11D extend toward the cylindrical peripheral wall 12 while taking a detour around the harness connection terminals 11A and 11B, and therefore, are bent to connect oblique linear portions 11c1 for taking a detour around the harness connection terminals 11A and 11B and linear portions 11c2 parallel to the harness connection terminals 11A and 11B. The relay portions 11c are each formed as a flat conductive piece made of a flat metal piece whose plate width is more than the plate thickness, and are completely embedded in the partition 13 by insert molding so as not to be exposed from the surface of the partition 13. Therefore, compared with the case in which the relay portions 11c are formed by pin terminals shaped like round bars or rectangular bars, or electric wires of circular cross section, the thickness of the partition 13 can be decreased, and the size of the rear housing 6 can be reduced.

Figure 6:
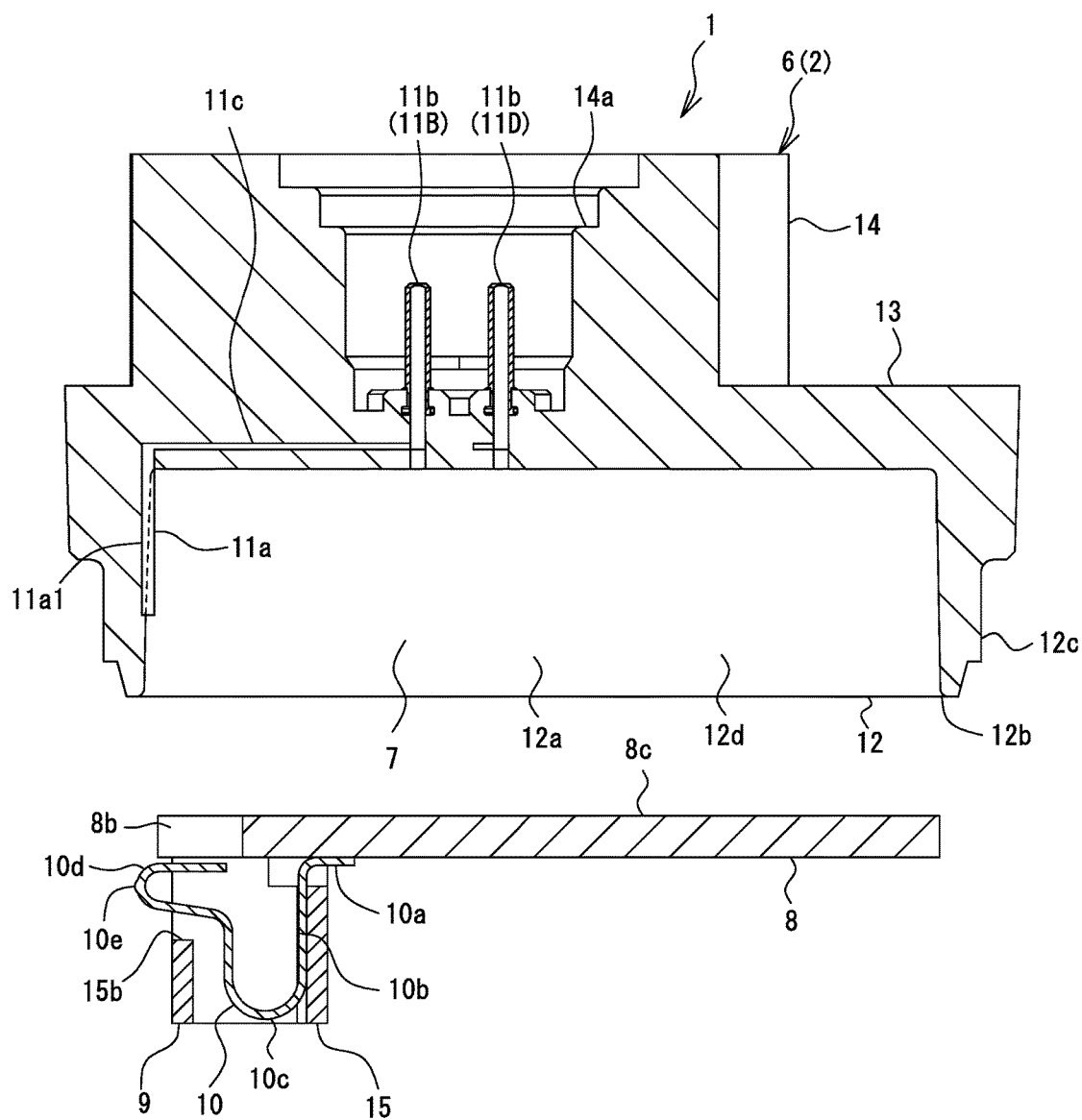
FIG. 6 is a cross-sectional view taken along line VI-VI in FIG. 2 and illustrates a state before the substrate is set in the rear housing.

In end portions of the relay portions 11c on the side of the cylindrical peripheral wall 12, the inner-surface contact pieces 11a each shaped like a flat plate extend in the height direction (length direction) of the cylindrical peripheral wall 12. The inner-surface contact pieces 11a are formed as flat conductive pieces made of flat metal pieces, and have flat rectangular contact surfaces. Such inner-surface contact pieces 11a can be formed by, for example, folding flat metal pieces. As illustrated in FIG. 6, the inner-surface contact pieces 11a have embedded portions 11a1 whose half the plate thickness is embedded in the inner peripheral surface 12d of the cylindrical peripheral wall 12, and are firmly held in the cylindrical peripheral wall 12 here. The length of the inner-surface contact pieces 11a from the partition 13 is set to be larger than the plate thickness of the substrate 8 in the cylinder axial direction Z of the cylindrical peripheral wall 12. For this reason, the fixed position of the substrate 8 in the cylinder axial direction Z can be adjusted, and the degree of flexibility in aligning the optical axis of the image pickup element 3a can be increased.

Connector 9

The connector 9 conductively connected to the harness connection terminals 11A to 11D is a so-called compression connector. The connector 9 includes a plurality of terminals 10 serving as "connector terminals", a housing 15 made of hard resin, and metal fixtures 16.

The housing 15 has terminal fixing portions 15a in which the terminals 10 are attached.

The terminals 10 respectively include substrate connected portions 10a to be soldered to the substrate 8, housing fixing portions 10b to be press-fitted and held in the terminal fixing portions 15a of the housing 15, spring portions 10c bent back in a U-shape, and contact portions 10d bent from the spring portions 10c and extending toward openings 15b and bent back in a U-shape. The contact portions 10d respectively have press contact portions 10e. The press contact portions 10e protrude from the openings 15b of the terminal fixed portions 15a to the outside of the housing 15.

Conductive Connection of Harness Connection Terminals 11A to 11D and Connector 9

The harness connection terminals 11A to 11D and the connector 9 are conductively connected during a process of assembling the imaging device 1 (FIGS. 6 and 7). The substrate 8 on which the connector 9 is mounted is set in the inner space 12a of the rear housing 6. The substrate 8 is assembled into the rear housing 6 in a state in which a flat surface 8c, on which the connector 9 is not mounted, is opposed to the partition 13. At this time, the press contact portions 10e of the terminals 10 in the connector 9 are brought into press contact with the inner-surface contact pieces 11a by the spring elastic force of the spring portions 10c. To align the press contact portions 10e with the inner-surface contact pieces 11a, the substrate 8 may be inserted parallel to the partition 13, or alternatively, may be obliquely inserted from the side of the connector 9. Even when the substrate 8 is thus obliquely inserted, the press contact portions 10e can be easily aligned with the inner-surface contact pieces 11a. In this way, the connector 9 on the substrate 8 can be easily and conductively connected to the harness connection terminals 11A to 11D. The substrate 8 can be fixed to the rear housing 6 by a mechanical method, such as screwing, or a chemical method using, for example, adhesive.

After the substrate 8 is set in the rear housing 6, the inter-substrate connector 8a and the inter-substrate connector 3c of the base 3b are connected, and further, the front housing 5 is fixed to the rear housing 6. Thus, the imaging device 1 can be obtained.

Operations and Effects of Imaging Device 1

Next, the operations and effects of the imaging device 1 and the components will be described except for the above-described descriptions.

The imaging device 1 has a conductive connection structure in which the press contact portions 10e of the terminals 10 are in press contact with the inner-surface contact pieces 11a of the harness connection terminals 11A to 11D disposed on the inner peripheral surface 12d of the cylindrical peripheral wall 12 in the cylinder-axis intersecting direction of the cylindrical peripheral wall 12, but does not have a conductive connection structure in which the harness connection terminals 11A to 11D and the terminals 10 are in press contact with each other in the thickness direction of the substrate 8. Therefore, the imaging device 1 can have high quality without any trouble, for example, without warping the substrate 8 and cracking soldered portions of various electronic components mounted on the substrate 8.

The length of the inner-surface contact pieces 11a is more than the thickness of the substrate 8 in the cylinder axial direction Z of the cylindrical peripheral wall 12. Therefore, the fixing position of the substrate 8 in the cylinder axial direction Z can be adjusted and the degree of flexibility in aligning the optical axis of the image pickup element 3a can be increased.

Figure 8:
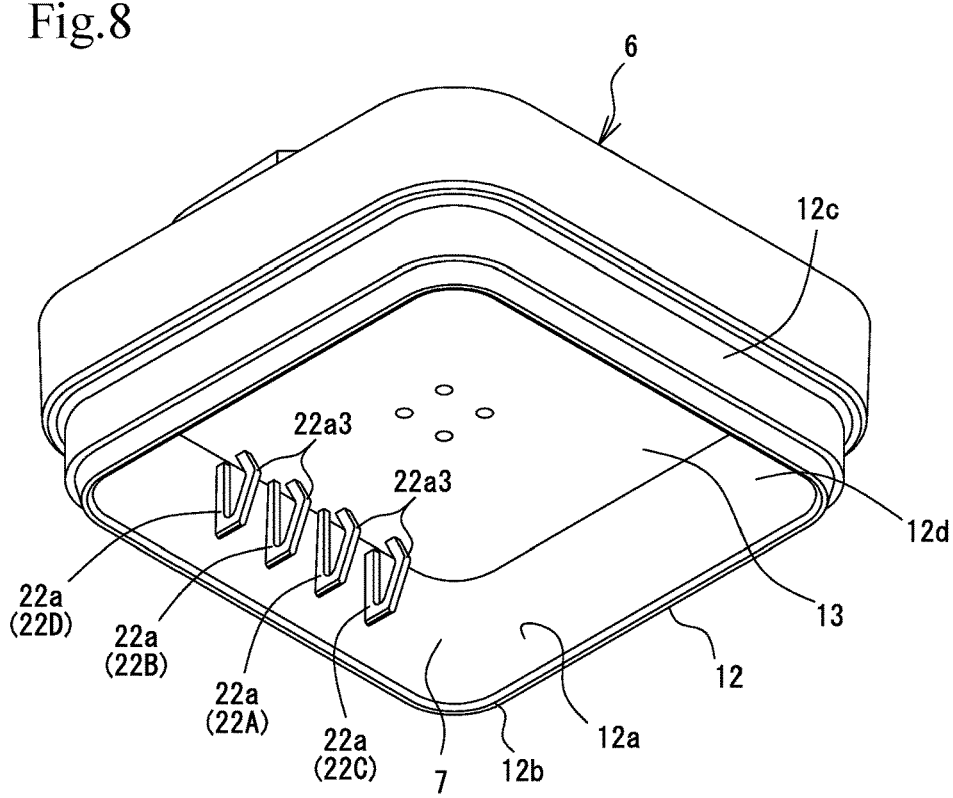
FIG. 8 is an external perspective view of a rear housing according to a second embodiment.
Figure 9:
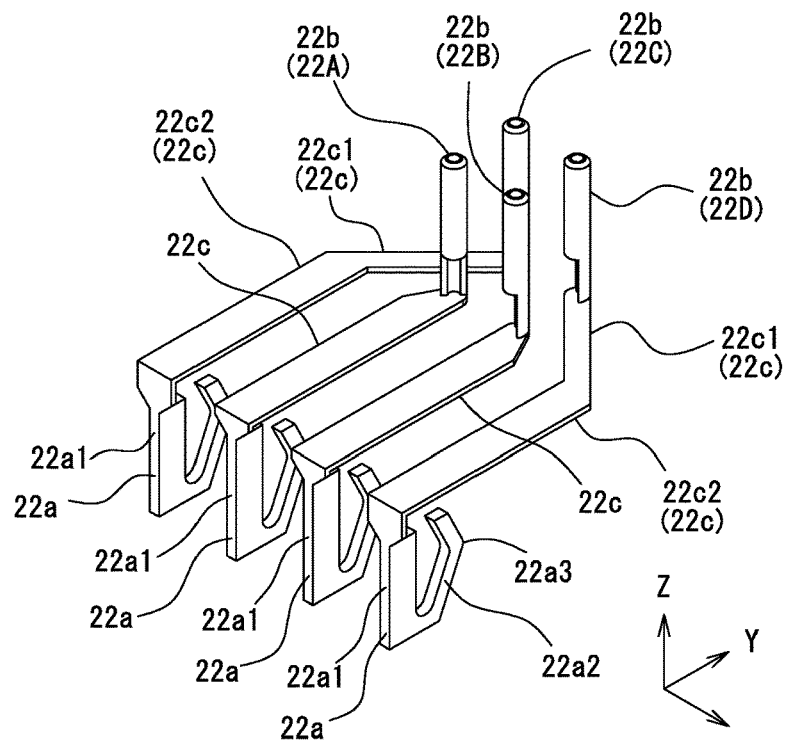
FIG. 9 is an external perspective view of harness connection terminals in FIG. 8.
Figure 10:
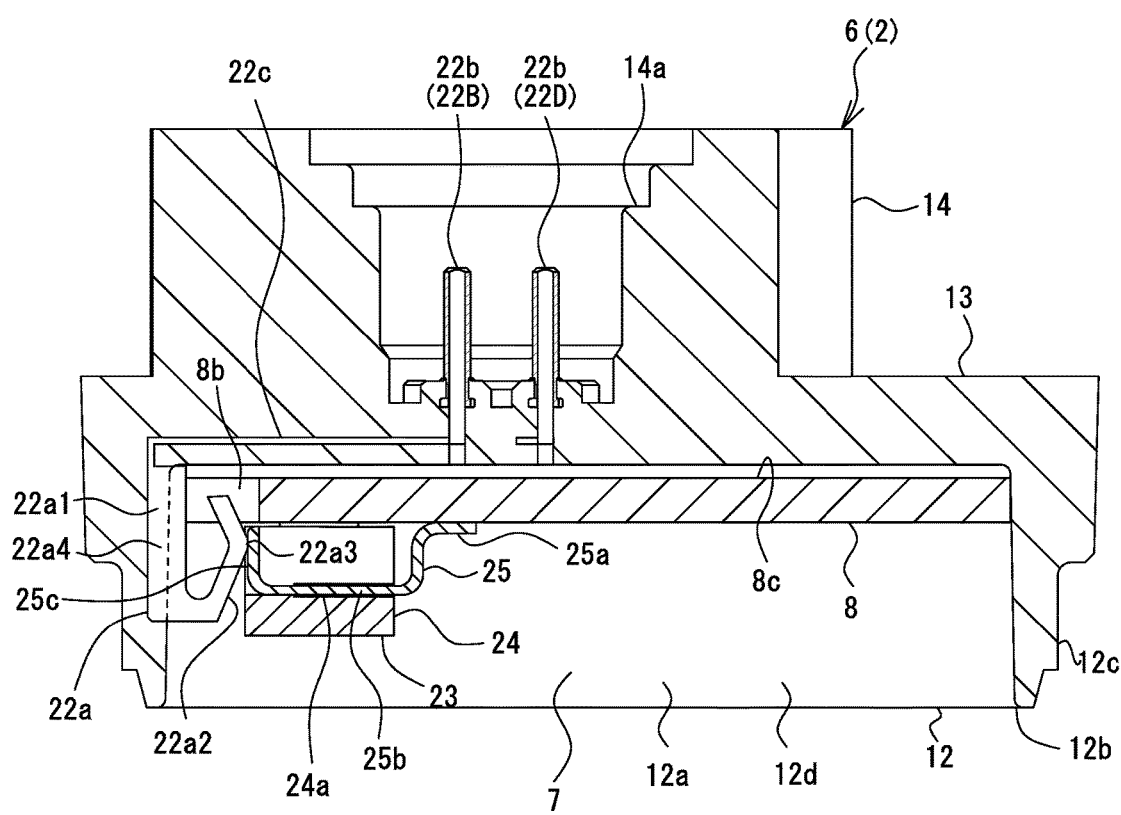
FIG. 10 is a cross-sectional view illustrating a state in which a substrate is set in the rear housing of FIG. 8.

Second Embodiment [FIGS. 8 to 10]

A second embodiment is different from the imaging device 1 of the first embodiment in harness connection terminals 22A to 22D and a connector 23. Since other structures are the same as those of the first embodiment, overlapping descriptions are skipped.

Harness Connection Terminals 22A to 22D

As illustrated in FIG. 9, the harness connection terminals 22A to 22D of the second embodiment respectively include spring contact pieces 22a serving as "inner contact portion", pin-shaped contact portions 22b serving as "outer contact portion", and relay portions 22c. Among these, the spring contact pieces 22a are different from those in the first embodiment.

For example, as illustrated in FIG. 8, the spring contact pieces 22a protrude toward the inside of a cylindrical peripheral wall 12 in such a manner that plate surfaces thereof intersect an inner peripheral surface 12d of the cylindrical peripheral wall 12. The spring contact pieces 22a are formed as flat conductive pieces by stamping a flat metal piece, and respectively have base portions 22a1 extending in the Z-direction and spring piece portions 22a2 projecting from lower ends of the base portions 22a1 toward the inside of the cylindrical peripheral wall 12. The spring piece portions 22a2 have respective press contact portions 22a3. As illustrated in FIG. 10, the base portions 22a1 have respective embedded portions 22a4 to be embedded in the inner peripheral surface 12d of the cylindrical peripheral wall 12, and the base portions 22a1 are fixed to the inner peripheral surface 12d by the embedded portions 22a4. The length of the press contact portions 22a3 of the spring contact pieces 22a from the partition 13 is more than the plate thickness of the substrate 8 in the cylinder axial direction Z of the cylindrical peripheral wall 12, similarly to the inner-surface contact pieces 11a of the first embodiment, and contact pieces 25c of terminals 25 with which the press contact portions 22a3 are to be in press contact also have flat contact surfaces extending in the cylinder axial direction Z, as will be described later. Therefore, the fixing position of the substrate 8 in the cylinder axial direction Z can be adjusted and the degree of flexibility in aligning the optical axis of the image pickup element 3a can be increased.

Connector 23

The connector 23 of the second embodiment in conductive contact with the above-described spring contact pieces 22a includes a housing 24, terminals 25, and metal fixtures 16. The housing 24 has terminal attachment grooves 24a in which the terminals 25 are attached. The terminals 25 respectively have substrate connected portions 25a, housing fixing portions 25b, and contact pieces 25c serving as "press contact portion."

Conductive Connection of Harness Connection Terminals 22A to 22D and Connector 23

To conductively connect the connector 23 to the harness connection terminals 22A to 22D, it is only required to set a substrate 8, on which the connector 23 is mounted, inside a rear housing 6, similarly to the first embodiment. At this time, the press contact portions 22a3 of the spring contact pieces 22a are brought into press contact with the contact pieces 25c of the terminals 25 in the connector 23 by the spring elastic force of the spring piece portions 22a2. In this way, the connector 23 can be easily brought into conductive contact with the harness connection terminals 22A to 22D.

Since the spring contact pieces 22a project inward from the inner peripheral surface 12d of the cylindrical peripheral wall 12, the conductive connection structure can be achieved such that the spring contact pieces 22a are in press contact with the contact pieces 25c of the terminals 25 in the connector 23 in the radial direction of the cylindrical peripheral wall 12. This can prevent the spring elastic force of the spring piece portions 22a2 of the spring contact pieces 22a from acting in the plate thickness direction of the substrate 8. Therefore, the imaging device 1 can have high quality without any trouble, for example, without warping the substrate 8 and cracking soldered portions of various electronic components mounted on the substrate 8.

Modification of Embodiments

Since the above embodiments can be carried out by a modification, the modification will be described.

While the four harness connection terminals 11A to 11D are provided in the embodiments, the number of harness connection terminals may be three or less or five or more.

While the cylindrical pin-shaped contact portions 11b are provided as "outer contact portion" of the harness connection terminals 11A to 11D in the above embodiments, the shape of "outer contact portion" is determined by the relation with the harness component 4, and may be other shapes.

While the relay portions 11c of the harness connection terminals 11A to 11D are completely embedded in the partition 13 in the above embodiments, they may be exposed on the side facing the inner space 12a of the rear housing 6.

While the substrate 8 is disposed in the rear housing 6 so that the flat surface 8c on which the connector 9 is not mounted is opposed to the partition 13 in the above embodiments, the surface on which the connector 9 is mounted may be disposed to be opposed to the partition 13. Even in this case, since the inner-surface contact pieces 11a and the spring contact pieces 22a have the lengths more than the plate thickness of the substrate 8 in the cylinder axial direction Z of the cylindrical peripheral wall 12, connection can be made without any problem.

What is claimed is:

1. An electronic component comprising:
   a housing; and
   a terminal fixed to the housing,
   the housing including
      an external-conductor connecting portion fitting and connecting to an external conductor,
      a cylindrical peripheral wall receiving a substrate with a connector mounted thereon, and
      a partition separating the external-conductor connecting portion and an inside of the cylindrical peripheral wall, and
   the terminal having an outer contact portion disposed in the external-conductor connecting portion to be in conductive contact with the external conductor, wherein the terminal includes an inner contact portion in press contact with a connector terminal of the connector in a cylinder axis intersecting direction of the cylindrical peripheral wall, and a relay portion embedded in the partition and extending to connect the outer contact portion and the inner contact portion.

2. The electronic component according to claim 1, wherein the inner contact portion has such a length as to protrude from the partition wall through a plate thickness of the substrate.

3. The electronic component according to claim 1, wherein the relay portion is formed as a flat conductive piece made of a flat metal piece.

4. The electronic component according to claim 1, wherein the inner contact portion is formed as an inner-surface contact piece having a flat contact surface exposed along an inner peripheral surface of the cylindrical peripheral wall.

5. The electronic component according to claim 1, wherein the inner contact portion is formed as a spring contact piece projecting from an inner peripheral surface of the cylindrical peripheral wall into an inner space of the cylindrical peripheral wall.

6. The electronic component including the connector according to claim 1, wherein the connector terminal has a press contact portion in press contact with the inner contact portion in the cylinder axis intersecting direction of the cylindrical peripheral wall.

7. An imaging device comprising the electronic component according to claim 1.

* * * * *